United States Patent [19]

Smith

[11] Patent Number: 4,591,966
[45] Date of Patent: May 27, 1986

[54] RECTIFYING NETWORK

[76] Inventor: Steve Smith, 5100 Channel Ave., Richmond, Calif. 94804

[21] Appl. No.: 495,970

[22] Filed: May 19, 1983

[51] Int. Cl.$^4$ .................................. H02P 13/24
[52] U.S. Cl. ........................ 363/91; 323/222; 323/290; 363/126
[58] Field of Search ............ 363/82, 90, 91, 93, 363/126; 323/222, 224, 282, 285, 290

[56] References Cited

U.S. PATENT DOCUMENTS

| | | | |
|---|---|---|---|
| 2,778,987 | 1/1957 | Schmidt, Jr. | 363/91 X |
| 3,217,239 | 11/1965 | Lunney | 363/91 X |
| 3,444,454 | 5/1969 | Burke et al. | 363/126 |
| 3,571,697 | 3/1971 | Phillips | 323/222 |
| 4,356,438 | 10/1982 | Iwasaki | 363/91 X |
| 4,451,876 | 5/1984 | Ogata | 363/21 |

FOREIGN PATENT DOCUMENTS 1015112  9/1957  Fed. Rep. of Germany ........ 363/93

Primary Examiner—Peter S. Wong
Attorney, Agent, or Firm—Thomas E. Schatzel

[57] ABSTRACT

An improved rectifying network employing a semiconductor diode, a saturable reactor connected in series with the diode between a pair of terminals, and means for biasing the saturable reactor to saturate the saturable reactor core for forward diode current flow.

14 Claims, 7 Drawing Figures

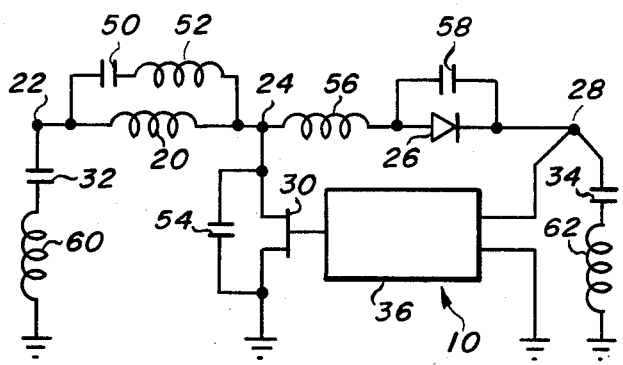
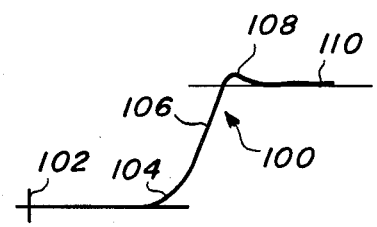
Fig_1 PRIOR ART
Fig_2 PRIOR ART
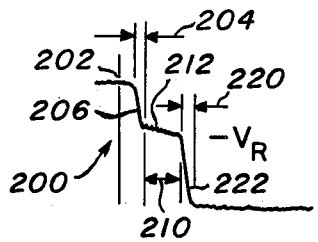
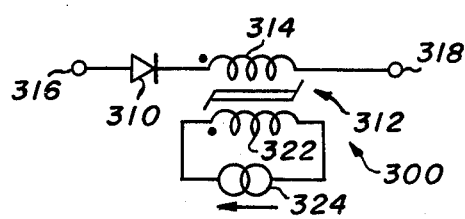
Fig_3
Fig_4
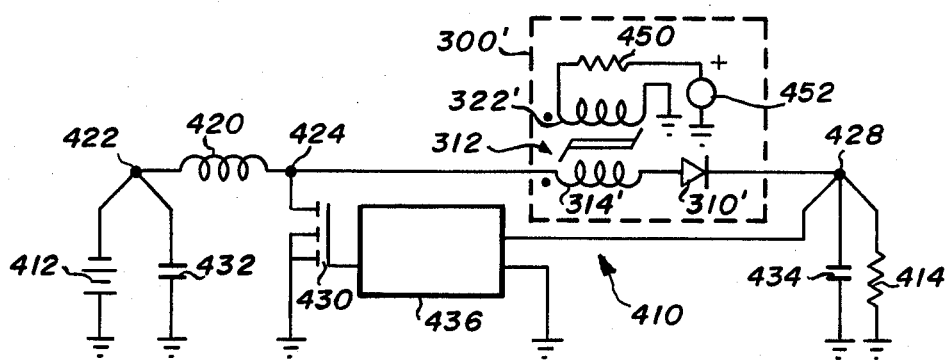
Fig_5
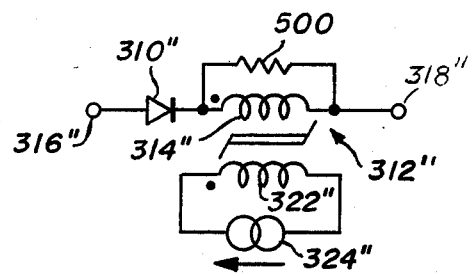
Fig_6

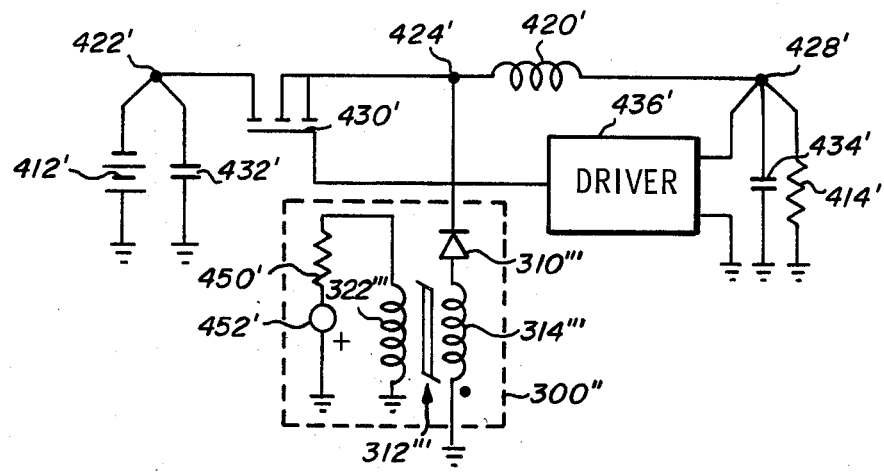
Fig_7

RECTIFYING NETWORK

BACKGROUND OF THE INVENTION

1. Field of the Invention

The present invention relates to power converters generally and more specifically to a rectifying network for use therein, the network having improved reverse recovery characteristics.

2. Description of the Prior Art

Semiconductor diodes have less than ideal characteristics. Consider, for example, their use in prior-art-type power converters (processors), particularly the topologically similar converters known as boost, buck and buck-boost. (Not only are the above-mentioned converters topologically similar but E. E. Landsman in an article entitled "A Unifying Derivation of Switching DC-DC Converter Topologies" published in the proceedings of the 1979 Power Electronics Specialist Conference, San Diego, Calif., of June 1979 on pages 19–21 discloses how the converters may all be represented by a simple canonical switching cell.)

Boost converters are commonly used to develop, from a voltage source, an increased-level potential for use by a load. Typically, boost converters employ an energy storing inductor connected between a node (terminal) for connection to a voltage source and a central node; a diode connected between the central node and a node (terminal) for connection to a load; and a transistor connected as a switch between the central node and a node common to the source and load (circuit ground). A pair of filter capacitors are also employed, one being connected from the source node to the common node and the other being connected from the load node to the common node. Additionally, a circuit is employed for driving the transistor-switch so as to maintain the potential developed at the load node at the increased level.

Buck converters, which are commonly used to develop a reduced-level potential, typically employ the same components in rearranged form. Specifically, the transistor-switch is connected between the source and the central nodes. Additionally, the diode (or a load-line-correcting network) is connected between the central and common nodes; and, the inductor is connected between the central and load node.

Finally, should the inductor, which may be thought of as a one-to-one auto transformer, of the boost converter by replaced by the primary winding of a transformer having a secondary winding across which the diode and the (load filter) capacitor are series connected, the converter is of the buck-boost configuration.

The above-mentioned prior-art-type boost converter is illustrated in FIG. 1 of the drawing generally designated by the number 10. Shown with the basic components are their associated parasitic elements. As previously indicated, the basic components include the energy storing inductor, which is designated 20 and which is shown connected between the source node (terminal), designated 22, and the central node, designated 24; the diode, which is designated 26 and which is shown connected to the load node (terminal), designated 28; the transistor-switch, which is designated 30 and which is shown connected between node 24 and circuit ground (the common node); the source and load filter capacitors, respectively designated 32 and 34; and the transistor driving circuit which is designated 36 and which is shown connected to (the gate of the transistor of) transistor-switch 30, to node 28, and to circuit ground.

The parasitic elements include the inductor 20 (parasitic) shunt capacitance, represented by a capacitor 50, the inductor 20 (parasitic leakage inductance, represented by an inductor 52 connected in series with capacitor 50 across inductor 20; the transistor-switch 30 equivalent shunt capacitance represented by a capacitor 54 connected in parallel with transistor-switch 30; the (parasitic) wiring inductance (associated with the path from inductor 20 and transistor-switch 30 to capacitor 34), represented by an inductor 56 connected in series with diode 26 between nodes 24 and 28; the diode 26 shunt capacitance, represented by a capacitor 58 connected in parallel with diode 26; the capacitor 32 (parasitic) inductance, represented by an inductor 60 connected in series with capacitor 32 between node 22 and circuit ground; and the capacitor 34 (parasitic) inductance, represented by an inductor 62 connected in series with capacitor 34 between node 28 and circuit ground.

The capacitance of (parasitic) capacitor 50 is normally several orders of magnitude less than the capacitance of capacitors 32 and 34. The (parasitic) inductance of inductor 52 may, or may not, be significant as compared to that of (parasitic) inductors 60, 56 and 62. The capacitance of each of capacitors 54 and 58 increases approximately exponentially as the voltage developed across the respective capacitor decreases. Finally, the inductance of each of (parasitic) inductors 60 and 62 is normally several orders of magnitude less than that of inductor 20.

Shown in FIG. 2 generally designated by the number 100 is a waveform illustrating the rise in the central node (node 24) potential following the time driver 36 initiates "turn-off" of transistor-switch 30, a time designated 102. At any instant, the rate of rise of the node potential is determined by the instantaneous current flow through inductor 20 and the sum of the instantaneous capacitances of capacitors 50, 54 and 58. As illustrated at 104, the node 24 potential rises slowly at first because the capacitance of capacitor 54 is relatively large. However, as the node 24 potential increases, the capacitor 54 capacitance decreases, increasing the rate at which the potential rises, as illustrated at 106. If transistor-switch 30 is configured around a device of the MOSFET type and if the current flow through inductor 20 is of the order of several amperes to several tens of amperes (or more), the rate of rise of the node 24 potential can exceed 10 volts per nanosecond. If the inductance of each of (parasitic) inductors 52, 56, 60 and 62 is negligible (small), the node 24 potential overshoots slightly, as illustrated at 108, the equilibrium potential, illustrated at 110, the equilibrium potential exceeding the node 28 potential (load potential) by the diode 26 forward conduction-voltage drop. If the inductance of (parasitic) inductor 56 and/or 62 is significant, the overshoot is greater, as the current flow through (parasitic) inductor 60 develops a voltage drop across (parasitic) inductor 56 and/or 62 for a period of time sufficient to cause the current flow through inductors 56 and 62 to reach the steady state value of the current flow through inductor 20 ($E = L(dI/dT)$). The so-called forward recovery time of diode 26 may add to the overshoot. Depending upon the particular diode, the contribution may be negligible or may be in the order of volts to tens of volts (or more) for nanoseconds to microseconds.

By a judicious choice of components, the inductance of (parasitic) inductors 60 and 62 may be made small enough to be negligible; however, the layout and the construction of diode 26 (what steel is present in the package and where) dictate the values of the inductance of (parasitic) inductor 56 and the capacitance of capacitor 58. Obviously, at least during the transistor-switch 30 "turn-off" period, it is important that the inductance of (parasitic) inductor 56 be made as small as possible, ideally approaching zero.

A waveform shown in FIG. 3 generally designated by the number 200 illustrates the fall of the central node (node 24) potential following the time driver 36 initiates "turn-on" of transistor-switch 30, a time designated 202. During a first period, designated 204, the node 24 potential drops, as indicated at 206, as dictated by the magnitude of the inductance and resistance associated with transistor-switch 30, diode 26, capacitor 24 and their inter connections. During this first period (period 204) transistor-switch 30 draws not only the current flowing through inductor 20 but also a reverse current flowing through diode 26.

Thereafter, during a second period, designated 210, the node 24 potential tends to "hold", as indicated at 212, at an intermediate potential "$V_R$" which is related to the reverse dynamic impedance of diode 26. It is during this second period (210) that the charge is "swept" out of diode 26. During this second period (period 210), the power dissipation in the transistor-switch 30 transistor is high as the transistor is conducting a large current (oftentimes several times the current flowing through inductor 20) while supporting a voltage drop, $V_R$.

Finally, after the charge has been "swept" out of diode 26 and the diode assumes a high reverse impedance state, during a third period, designated 220, the node 24 potential falls at a relatively fast rate, as illustrated at 222, governed by the current transistor-switch 30 draws from capacitors 50, 54 and 58 (in a fashion analogous to the "turn-off" of the transistor-switch). If transistor-switch 30 is configured around a device of the MOSFET type, the rate of fall of the node 24 potential may exceed 10 volts per nanosecond.

An inductor interposed between node 24 and diode 26 would tend to limit the peak reverse current conducted through diode 26 as well as support a voltage drop during the second period (period 210). As a result, the power dissipated by the transistor of transistor-switch 30 would be reduced (as well as that dissipated by diode 26) increasing the overall converter 10 efficiency. Unfortunately, to be effective, the required interposed inductor inductance would have to be tens or hundreds of times larger than the maximum inductance usually tolerable for good circuit operation during transistor-switch 30 "turn-off" periods. For a further discussion of the use of an interposed inductor with a complex circuit employing secondary windings and diodes to couple current pulses to storage elements, the reader is referred to the article by L. G. Meares which was published in the Ninth Power Conversion Conference paper B-2.

Some semiconductor diodes tend to oscillate when subjected to a high reverse dV/dT just after completing their reverse recovery. The oscillation may persist for many tens of cycles often at a frequency at, or near, the self-resonant frequency or capacitor 34 (shown in FIG. 1) and (capacitor 34 parasitic) inductor 62. When the inductance of (parasitic) inductor 56 is very small, when the inductance of (parasitic) inductor 60 and the capacitance of capacitor 34 is small, and when the capacitance of capacitor 50 and/or 54 is significant (large), the amplitude of the oscillation may be comparable to, or exceed, the level of the voltage source (connected to node 22), high enough to cause component failures. The oscillation mechanism is believed to involve a space charge trapped within diode 26 when the depletion region rapidly formed during the third period (designated 220 in FIG. 3), possibly being similar in nature to IMPATT or TRAPATT oscillations.

The oscillation is difficult to suppress using conventional R-C damping methods. However, an inductor interposed between node 24 and diode 26 can be effective in controlling the oscillation, particularly when the interposed inductance is much larger than the inductance of (parasitic) inductor 62 and/or where the interposed inductor inductance is sufficiently large (to act as a low-pass filter with the relatively large capacitance of capacitor 58 at low reverse bias so) that diode 26 is not subjected to a high instantaneous dV/dT during the third period (period 220).

Semiconductor diodes of the type which are designated 15R4 by Solid State Devices Inc. and those which are designated UES 703 by Unitrode Inc. were observed under similar operating conditions, specifically, a forward current of from 5 to 20 amps and a peak reverse current of 10 to 30 amps (during the second period, period 210). Diodes of the 15R4 type exhibited a reverse recovery time of about 8 nanoseconds; and, diodes of the UES 703 type exhibited a reverse recovery time of approximately 20 nanoseconds (being not quite as "crisp"). Both types of diodes exhibited oscillations in the 50-80 Megahertz region. The use of an interposed inductor (between node 24 and diode 26) to reduce the dV/dT during the third period (period 222) from approximately 20 volts per nanosecond to approximately 5 volts per nanosecond was effective in suppressing the oscillations. An interposed inductor inductance of about 10-20 nanohenrys reduced the oscillations significantly; and, an inductance of about 1 microhenry eliminated the oscillations. Unfortunately, as previously indicated, an interposed inductor inductance of even a hundred nanohenrys is usually intolerable for good circuit operation during transistor-switch 30 "turn-off" periods.

SUMMARY OF THE PRESENT INVENTION

It is therefore a primary object of the present invention to provide a means of suppressing semiconductor diode oscillations in power converters Another primary object of the present invention is to provide a means of reducing semiconductor diode reverse current in power converters.

Briefly, the preferred embodiment of a rectifying network in accordance with the present invention employs a semiconductor diode, a saturable reactor connected in series with the diode, and means for biasing the saturable reactor to saturate the saturable reactor core for forward diode current flow.

The present invention is advantageous in that it affords the ability to provide a network having improved rectifying characteristics.

Another advantage of the present invention is the ability it affords to increase the efficiency of power converters.

Still another advantage of the present invention is the ability it affords to suppress spurious power converter oscillations.

These and other objects and advantages of the present invention will no doubt become apparent to those skilled in the art after having read the following detailed description of the preferred embodiments which are illustrated in the several figures of the drawing.

IN THE DRAWING

FIG. 1 is a schematic diagram illustrating both the basic components and parasitic elements of a prior-art-type boost converter;

FIGS. 2 and 3 are waveforms of a potential developed by the converter shown in FIG. 1;

FIG. 4 is a schematic diagram illustrating the preferred embodiment of a rectifying network in accordance with the present invention;

FIG. 5 is a schematic diagram illustrating a boost converter employing the network shown in FIG. 4;

FIG. 6 is an alternative embodiment of a rectifying network in accordance with the present invention; and FIG. 7 is a schematic diagram illustrating a buck converter employing the network shown in FIG. 4.

DETAILED DESCRIPTION OF THE PREFERRED EMBODIMENTS

A preferred embodiment of a rectifying network in accordance with the present invention is illustrated in FIG. 4 of the drawing generally designated by the number 300. Network 300 is shown to employ a semiconductor diode 310; a saturable reactor (inductor) 312 which includes a winding 314 connected in series with diode 310 between a pair of terminals 316 and 318; and means for biasing the saturable reactor to saturate the saturable reactor core for forward diode current flow. A preferred method of saturating the saturable reactor 312 core is by means of an additional saturable reactor 312 winding, designated 322, and a current source 324 connected thereacross.

As an example to further clarify the manner and process of making and using the present invention, a power converter (processor) of the boost circuit configuration is shown in FIG. 5 employing a rectifying network in accordance with the present invention, the network being designated 300'. The boost converter, which is generally designated 410, develops from a voltage source, represented by a battery 412, an increased-level potential for use by a load, represented by an impedance 414. Boost converter 410 includes an evergy storing inductor 420 connected between a node (terminal) 422, for connection to the voltage source, battery 412, and a central node, designated 424; network 300' connected between node 424 and a node (terminal) 428, for connection to a load, impedance 414; and a transistor connected as a switch between node 424 and a source and load common node (circuit ground), the transistor-switch being designated 430. Also included is a filter capacitor 432 connected between node 422 and circuit ground and a filter capacitor 434 connected between node 428 and circuit ground. Additionally, connected to transistor switch 430, node 428 and circuit ground is a circuit 436 for driving the transistor-switch so as to maintain the potential developed at node 428 at the increased level.

Network 300' employs a semiconductor diode, designated 310'; a saturable reactor, designated 312', which includes a winding, designated 314', connected in series with diode 310' between nodes 424 and 428; and means for biasing the saturable reactor to saturate to saturable reactor core for forward diode currents, in this case, currents flowing from node 424 to node 428. For saturating the saturable reactor 312' core, the saturable reactor has another winding, designated 322', which is connected to a current source developed from a voltage source 430 (or battery 412) and a current limiting resistor 432 connected in series with winding 422' across the voltage source.

The forward saturable-reactor-312'-core bias minimizes the inductance presented by saturable reactor 312' to a forward diode 310 current flow permitting the use of an inductance sufficient to limit reverse diode current flow to a moderate value, reduce power dissipation in the transistor of transistor-switch 430 and the diode, and suppress diode related oscillations.

Preferably, the core of saturable reactor 312' is of the small tape-wound type of thin gauge alloy having a flux capacity sufficient to provide a volt-second support of at least the load potential (the potential developed at node 428) for the period necessary for diode 310' to undergo reverse recovery. The use of a high radial build of the alloy wraps on the core reduces the dV/dT developed across diode 310' as the inner wraps saturate sooner than the outer wraps. For reverse recovery times of less uthan 100 nanoseconds, the preferable alloy thickness is ¼ mil or less. With thicker alloys, the core losses are increased; however, the dV/dT developed across diode 310' is reduced as the saturation wave takes time to move through the thickness of the alloy. Typically, winding 314' consists of a single turn; and, winding 322' consists of one or, at most, a few turns.

It is important to note that the saturable reactor of the present invention (designated 312 in FIG. 4 and 312' in FIG. 5) is as fast as the fastest transistor-switch (430) transistors and diode (310 and 310') diodes available today (reverse recovery times of 10 nanoseconds at 20 amps) and is, therefore, not dependent on the speed of auxiliary components.

An alternative embodiment of the present invention is illustrated in FIG. 6 of the drawing. The embodiment shown in FIG. 6 differs from the embodiment shown in FIG. 4 in that the former embodiment additionally employs a resistor 500 connected across the winding which is in series with the diode (the winding being designated 314", the saturable reactor being designated 312" and the diode being designated 310"). Resistor 500 is employed to control the peak voltage developed across the winding (314") by the saturable reactor (312") when the saturable reactor core is reset immediately following the cessation of the diode (310") reverse current flow.

It is contemplated that after having read the preceding disclosure certain alterations and modifications of the present invention will no doubt become apparent to those skilled in the art. It is therefore intended that the following claims be interpreted to cover all such alterations and modifications as fall within the true spirit and scope of the invention.

I claim:

1. A rectifying network comprising in combination:
   a pair of terminals;
   a diode;
   a saturable reactor including a core and a first winding would on said core, said first winding being connected in series with said diode between said terminals; and means for biasing said core into saturation for forward diode current flow.

2. A rectifying network as recited in claim 1 wherein said biasing means includes current source means and a second winding wound on said core, said second winding being connected across said current source.

3. A rectifying network as recited in claim 2 wherein said current source means includes voltage source means and a current limiting resistor connected in series with said voltage source means.

4. A rectifying network as recited in claim 1 further comprising a resistor connected across said first winding, said resistor for limiting to a predetermined level the voltage developed across said first winding when said bias means resets said core following cessation of reverse diode current flow.

5. In a power converter employing an energy storing inductor a transistor-switch and a rectifying means, an improved rectifying means comprising in combination:
   a pair of terminals;
   a semiconductor diode;
   a saturable reactor including a core and a first winding connected in series with said diode between said terminals; and
   means for biasing said core into saturation for forward diode current flow.

6. In a power converter as recited in claim 5 wherein said biasing means includes current source means and a second winding wound on said core, said second winding being connected across said current source.

7. In a power converter as recited in claim 5 further comprising a resistor connected across said first winding, said resistor for limiting to a predetermined level the voltage developed across said first winding when said bias means resets said core following each cessation of reverse diode current flow.

8. A boost converter comprising in combination:
   a node for connection to a voltage source;
   a central node;
   a node for connection to a load;
   a common node;
   an energy storing inductor connected between said source and said central nodes;
   switching means connected between said central and said common nodes;
   a rectifying network including a semiconductor diode, a saturable reactor having a core and a first winding wound on said core, said first winding being connected in series with said diode between said central and said load nodes, and means for biasing said core into saturation for forward diode current flow; and
   means for driving said switching means so as to maintain the potential developed at said load node at a predetermined level.

9. A boost converter as recited in claim 8 wherein said network further includes a resistor connectd across said first winding, said resistor for limiting to a predetermined level the voltage developed across said first winding when said bias means resets said core following each cessation of reverse diode current flow.

10. A power converter for developing from a voltage source an output voltage of predetermined level for driving a load, the power converter comprising in combination:
   a first node;
   a second node;
   a third node, a pair of said first, second and third nodes for connection to the voltage source and another pair of said first, second and third nodes for connection to the load;
   a central node;
   an energy storing inductor connected between said first and said central nodes;
   a switching means connected between said second and said central nodes;
   a rectifying network including a semiconductor diode, a saturable reactor having a core and a first winding wound on said core, said first winding being connected in series with said diode between said third and said central nodes, and means for biasing said core into saturation for forward diode current flow; and
   means for driving said switching means so as to maintain the output voltage at the predetermined level.

11. A buck converter comprising in combination:
   a node for connection to a voltage source;
   a central node;
   a node for connection to a load;
   a common node;
   an energy storing inductor connected between said central and said load nodes;
   switching means connected between said source and said central nodes;
   a rectifying network including a semiconductor diode, a saturable reactor having a core and a first winding wound on said core, said first winding being connected in series with said diode between said central and said common nodes, and means for biasing said core into saturation for forward diode current flow; and
   means for driving said switching means so as to maintain the potential developed at said load node at a predetermined level.

12. A rectifying network comprising in combination:
   a pair of terminals;
   a semiconductor junction;
   a saturable reactor including a core and a first winding would on said core, said first winding being connected in series with said semiconductor junction between said terminals; and
   means for biasing said core into saturation for forward diode current flow.

13. A method of rectifying a current, the method comprising in combination the steps of:
   biasing a saturable core into saturation and
   passing the current through the series combination of a diode and a first winding wound on said core, said core being biased into saturation for forward diode current flow.

14. A method as recited in claim 13 wherein the step of biasing said core into saturation includes the step of passing a biasing current through a second winding wound on said core.

* * * * *